(No Model.)

T. G. MANDT.
WHIFFLETREE HOOK.

No. 536,384. Patented Mar. 26, 1895.

WITNESSES:
F. L. Ouraud.
W. L. Coombs

INVENTOR:
Targe G. Mandt,
by Louis Bagger & Co.
Attorneys

UNITED STATES PATENT OFFICE.

TARGE G. MANDT, OF STOUGHTON, WISCONSIN, ASSIGNOR TO SAMUEL F. PEARL, OF OVID, MICHIGAN.

WHIFFLETREE-HOOK.

SPECIFICATION forming part of Letters Patent No. 536,384, dated March 26, 1895.

Application filed June 25, 1894. Serial No. 515,652. (No model.)

*To all whom it may concern:*

Be it known that I, TARGE G. MANDT, a citizen of the United States, and a resident of Stoughton, in the county of Dane and State of Wisconsin, have invented certain new and useful Improvements in Whiffletree - Hook Fastenings; and I do hereby declare that the following is a full, clear, and exact description of the invention, which will enable others skilled in the art to which it appertains to make and use the same, reference being had to the accompanying drawings, which form a part of this specification.

My invention relates to improvements in means for securing whiffletree hooks to whiffletrees, and its object is to provide an improved construction of the same whereby the shank of the hook may be securely connected with the whiffletree without liability of accidental disengagement therefrom.

The invention consists in the novel construction and combination of parts hereinafter fully described and claimed.

Figure 1:
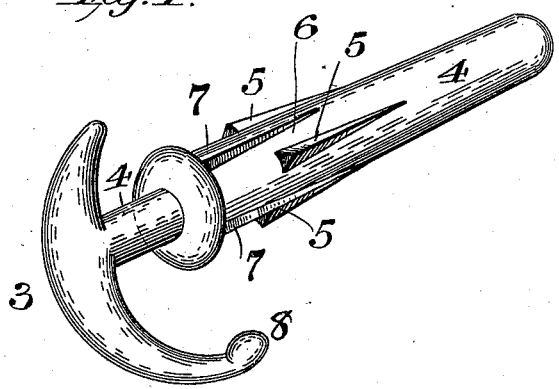
Figure 2:
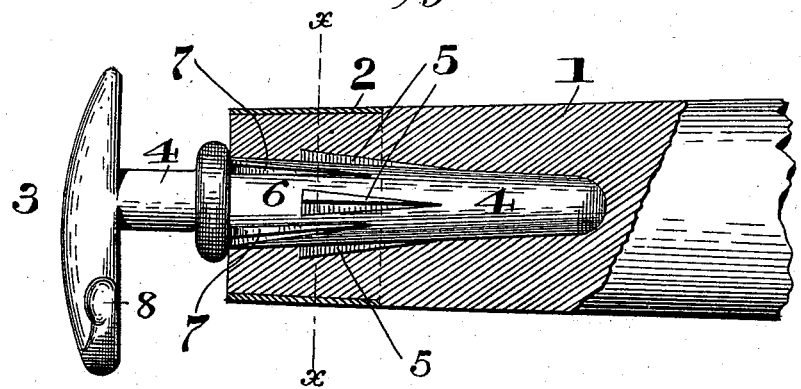
Figure 3:
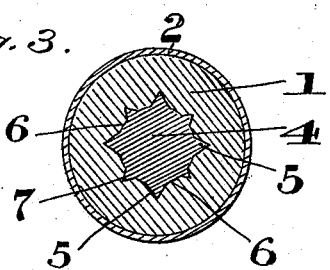

In the accompanying drawings: Figure 1 is a perspective view of a whiffletree hook, constructed in accordance with my invention, showing the wedge shaped projections on the shank by which the same is held securely in place. Fig. 2 is a longitudinal sectional view showing the shank inserted in one end of a whiffletree. Fig. 3 is a transverse sectional view on the line $x-x$, Fig. 2.

The ordinary manner or methods of attaching whiffletree hooks to whiffletrees are very objectionable in many respects, which are well known to those versed in the art. Many attempts have been made to secure an efficient mode of securing the said hooks in place, but all have proved more or less objectionable owing to inherent defects in construction.

My invention is designed to obviate such objections, and to provide an improved hook which can be readily driven into the end of a whiffletree without danger of injuring the same, and which will be securely held in place without liability of accidental disengagement therefrom.

In the said drawings the reference numeral 1 designates an ordinary whiffletree having each end bored out to receive the shank of the whiffletree hook.

The numeral 2 designates the ferrule, which may be of any suitable construction, applied to the ends of the whiffletree to prevent splitting of the same when the shank of the hook is driven into the bore thereof.

The numeral 3 designates the hook, having a shank 4, of tapering or cylindrical form, provided near its outer end with a series of wedge-shaped longitudinal projections or ribs 5, spaced equi-distant from each other, and having an open space 6 between their enlarged butts or outer ends. The said shank is also formed with another peripheral row of wedge-shaped ribs 7, similar to ribs 5, the enlarged outer ends of which abut against an annular flange or abutment collar near the outer end of the shank 4. These ribs are disposed around the shank alternately with the ribs or wedges 5, and in alignment with the spaces therebetween, as will be seen more clearly by reference to Fig. 1.

The numeral 8 designates the hook proper, which engages with the cock-eye or tug of a trace, and which may be of any ordinary or suitable construction.

The hook is connected with the whiffletree by inserting the shank thereof in the bore in the end and then driving the shank home, the ferrule preventing splitting of the end of the whiffletree. In thus driving the shank into said bore the wedges or ribs 5, will first engage with or bite into the wood of the whiffletree and the second series of wedges or ribs 7 following the same will also enter the wood compressing the wood between said first-mentioned ribs tightly against the sides of the same so that the shank will be held firmly in place in the bore of the whiffletree.

Having thus described my invention, what I claim is—

As an improved article, a whiffletree hook comprising the tapering cylindrical shank having a hook at one end and an annular collar between its ends, the series of longitudinal wedge shaped projections or ribs on the periphery thereof with their large ends abutting against and made integral with said collar and the series of wedge shaped ribs alternating therewith and with their large ends terminating intermediate the ends of said first mentioned ribs, substantially as and for the purpose specified.

In testimony that I claim the foregoing as my own I have hereunto affixed my signature in presence of two witnesses.

TARGE G. MANDT.

Witnesses:
BEN E. WAIT,
A. O. ERICKSON.